Figure 1:
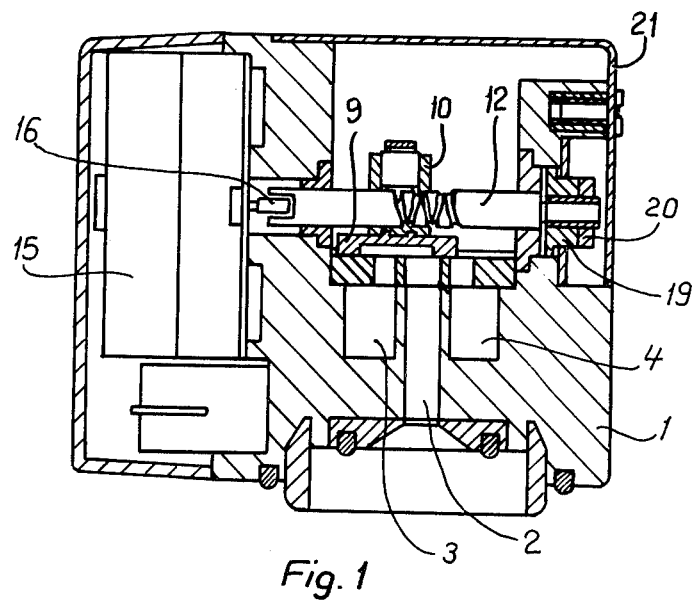

United States Patent [19]
Olander

[11] 4,080,995
[45] Mar. 28, 1978

[54] PULSATOR FOR MILKING MACHINES

[75] Inventor: Karl Erik Olander, Sodertalje, Sweden

[73] Assignee: Alfa-Laval AB, Tumba, Sweden

[21] Appl. No.: 718,427

[22] Filed: Aug. 27, 1976

[30] Foreign Application Priority Data

Sep. 4, 1975  Sweden .............................. 75098111

[51] Int. Cl.[2] ................................................ A01J 5/14
[52] U.S. Cl. ............................ 137/624.15; 137/624.2;
137/625.25; 119/14.28
[58] Field of Search ............... 137/624.13, 624.15, 137/625.25, 624.18, 624.2; 251/251, 133, 265; 74/58; 119/14.01, 14.27, 14.28, 14.29

[56] References Cited

U.S. PATENT DOCUMENTS

| | | | |
|---|---|---|---|
| 1,352,726 | 9/1920 | Dagsh | 119/14.29 |
| 1,766,224 | 6/1930 | Montevaldo | 74/58 |
| 2,182,522 | 12/1939 | Lindsey | 74/58 |
| 2,389,918 | 11/1945 | Macgil | 74/58 X |
| 2,625,948 | 1/1953 | Marlow | 119/14.27 UX |
| 3,029,073 | 6/1963 | Conde | 137/624.13 X |
| 3,480,038 | 11/1969 | Simms | 137/624.13 X |

Primary Examiner—Alan Cohan
Attorney, Agent, or Firm—Cyrus S. Hapgood

[57] ABSTRACT

A slide is adapted to be reciprocated along a slide plane to connect each pulsation opening of the milking machine pulsator alternately to vacuum and to atmosphere. A spindle rotated at constant speed by a suitable motor is provided with an endless, helically-shaped groove; and a driving means engaged in this groove is connected to the slide for reciprocating the same.

5 Claims, 3 Drawing Figures

U.S. Patent     March 28, 1978     4,080,995

PULSATOR FOR MILKING MACHINES

The present invention relates to a pulsator for milking machines which comprises a slide plane provided with an evacuation opening connected to a vacuum source and one or more pulsation openings connected to a milking means, and a reciprocating slide coacting with the slide plane for connecting each pulsation opening alternately to the evacuation opening and the atmosphere to provide a pulsing sub-atmospheric pressure.

Presently, very high demands are placed on pulsators for milking machines with regard to the function and reliability thereof. Thus, the pulse frequency must not differ appreciably from the specified value. A common requirement is that the difference from the pulse frequency specified on the pulsator must not exceed one percent. Further, when pulsating in couples, the pulsation cycle must be uniform, which means that the pulsator must not be marred by any so-called limping.

To meet these requirements, a pulsator has been proposed which is provided with a rotating slide cooperating with a slide plane having evacuation and pulsation openings required for the pulsing function, the rotary slide being driven by an electric synchronous motor which operates at a constant rotational velocity.

By using a synchronous motor as a power source, it is possible to maintain the difference from the specified pulse frequency within the allowed limits. In practice, however, pulsators of this design have been impaired by considerable drawbacks, one of which is that a transmission gear is required to obtain the desired rotational velocity of the slide. Thus, if the desired pulse frequency is 50 pulses per minute, a reduction gear is required which gives the slide a rotational velocity of 50 revolutions per minute.

Another drawback is that the rotating slide is unsuitable from the point of view of wear. Thus, the slide becomes heavily worn because it rotates in the same direction all the time, which impairs the durability and reliability of the pulsator. Further, any so-called limping is not adjustable.

It is also known to use a pulsator in which a slide is reciprocated by an electric motor the rotational movement of which is transformed into a reciprocating movement by means of a crank mechanism. However, such a drive means is rather complicated, and the crank mechanism provides a constantly varying velocity of movement of the slide. Therefore, such pulsators have not proved to be suitable in practical use.

The principal object of the invention is to provide a pulsator of the first-mentioned kind in which the above-noted drawbacks of previously known pulsators are eliminated. This is obtained by a pulsator which, according to the invention, is characterized generally in that the slide is adapted to be driven by means of a spindle connected to a motor operating at a constant rotational velocity, the spindle being provided with an endless, helically-shaped groove in which a driving means connected to the slide is engaged.

Figure 2:
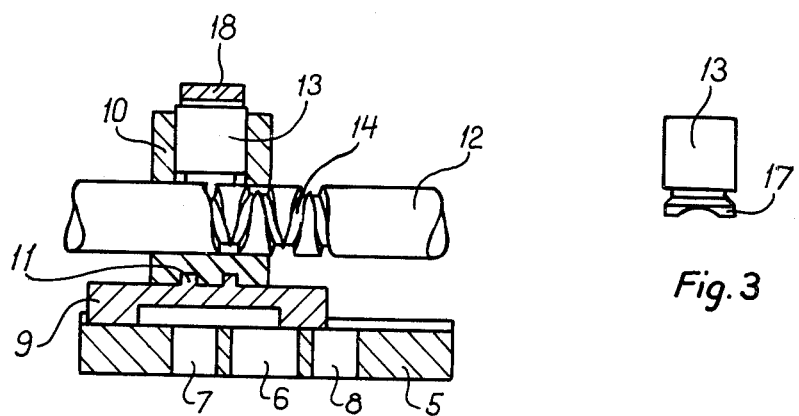
Figure 3:
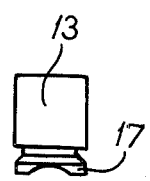

The invention will be described in more detail below with reference to the accompanying drawing, in which FIG. 1 is a longitudinal sectional view of a preferred embodiment of the pulsator according to the invention;

FIG. 2 is a detail view of a portion of the pulsator in FIG. 1 on an enlarged scale; and FIG. 3 is a side view of a part included in the pulsator.

The pulsator shown in the drawing comprises a housing 1 provided with an evacuation opening 2 adapted to be connected to a vacuum source (not shown), and two pulse openings 3 and 4 adapted to be connected to the right and left hand portions, respectively, of a milking means (not shown). By means of a slide mechanism comprising a slide plane 5 provided with openings 6, 7 and 8 and a slide 9 cooperating therewith, the pulse openings 3 and 4 are adapted to be connected alternately to the evacuation opening 2, as will be further described below.

As shown on an enlarged scale in FIG. 2, the slide 9 is reciprocated along the slide plane 5 by a driving block 10 via a spline connection 11. The driving block 10 is in turn driven by a spindle 12 via a cylindrical driving pin 13 engaged in an endless groove 14 of the spindle. The spindle 12 is operatively connected to an electric synchronous motor 15 by means of a shaft coupling 16 (FIG. 1).

The driving pin 13, which is shown in elevation in FIG. 3, is provided with a protrusion 17 extending into the groove 14 of the spindle 12. During rotation of the spindle, the driving block 10 and with it the slide 9 are caused to reciprocate in the longitudinal direction of the spindle. The driving pin 13 is retained by means of a bracket 18, and in order to allow the protrusion 17 to adjust itself constantly to the direction of the groove 14, the pin 13 is rotatably journalled in the driving block 10.

The pitch of the groove 14 is constant in both directions, and since the spindle 12 is rotated at a constant velocity, a uniform, accurately controlled movement of the slide is obtained. The axial extension of the groove 14 is adapted to the desired length of stroke of the slide. The desired pulse frequency is provided by adjusting the pitch of the groove 14 and the rotational velocity of the motor 15. In the embodiment according to FIG. 2, one pulse period of the slide 9 corresponds to five revolutions of the spindle 12. If the motor 15 is rotated at 250 revolutions per minute, a pulse frequency of 50 periods per minute is obtained, which is a value commonly used in milking.

In FIG. 2, the slide 9 is shown in its left-hand end position, the vacuum opening 6 of the slide plane 5 being connected to the left-hand opening 7, while the right-hand opening 8 is uncovered and thus connected to the atmosphere. In the right-hand end position of the slide, the connections are of course reversed, whereby an alternating pulsation is obtained.

In order to make the periods of sub-atmospheric and atmospheric pressure of the opening 7 as long as the corresponding periods of the opening 8, it is necessary that the end positions of the slide be properly oriented with relation to the openings of the slide plane. In other words, the movement of the slide must be symmetric with respect to a line extending through the center of the slide plane. In case of any asymmetry, the length of these periods will vary mutually between the right-hand and left-hand openings 7 and 8, which results in an uneven operation of the pulsator (so-called limping).

In order to eliminate any such uneven operation of the pulsator, the axial position of the spindle 12 is adjustable. More particularly, the right-hand portion of the spindle (FIG. 1), which is tapped, is threadedly engaged in a rotatable bushing 19 provided with a corresponding thread. The bushing 19 is axially fixed in the pulsator housing, and by relative rotation of the bushing and the spindle 12, the axial position of the latter can be adjusted. The shaft coupling 16 allows such axial adjustment of the spindle, and by means of a locking nut 20, the spindle is kept fixed in the adjusted position with relation to the bushing 19. Access to the parts 19 and 20, for effecting this adjustment, may be readily obtained by removing a detachable cover piece 21 of the housing.

I claim:

1. A milking machine pulsator comprising means forming a slide plane having an evacuation opening adapted for connection to a vacuum source, the slide plane also having at least one pulsation opening adapted for connection to a milking means, a slide adapted to be reciprocated along the slide plane to connect each pulsation opening alternately to the evacuation opening and to atmosphere, thereby providing a pulsing sub-atmospheric pressure, a motor operable at a constant rotational velocity, a spindle operatively connected to the motor for rotation thereby and having an endless, helically-shaped groove, and driving means engaged in said groove and connected to the slide for reciprocating the same along the slide plane during rotation of the spindle by the motor.

2. The pulsator of claim 1, in which the motor is an electric synchronous motor.

3. The pulsator of claim 1, comprising also means for adjusting the spindle axially relative to the slide plane.

4. The pulsator of claim 3, comprising also a housing to which said slide plane is fixed and in which said spindle is rotatably mounted, said adjusting means including a bushing having a threaded connection with the spindle at one end portion thereof are mounted for rotation in the housing, the bushing being fixed against movement relative to the housing and axially of the spindle, whereby relative rotation of the bushing and spindle causes axial adjustment of the spindle relative to the slide plane.

5. The pulsator of claim 4, comprising also a locking nut threaded on said end portion of the spindle and releasably securing said bushing against rotation relative to the spindle.

* * * * *